United States Patent
Fan et al.

(10) Patent No.: US 6,594,576 B2
(45) Date of Patent: Jul. 15, 2003

(54) USING LOCATION DATA TO DETERMINE TRAFFIC INFORMATION

(75) Inventors: Rodric C. Fan, Fremont, CA (US); Xinnong Yang, San Rafael, CA (US); James D. Fay, Palo Alto, CA (US)

(73) Assignee: At Road, Inc., Fremont, CA (US)

( * ) Notice: Subject to any disclaimer, the term of this patent is extended or adjusted under 35 U.S.C. 154(b) by 0 days.

(21) Appl. No.: 09/898,682

(22) Filed: Jul. 3, 2001

(65) Prior Publication Data

US 2003/0009277 A1 Jan. 9, 2003

(51) Int. Cl.⁷ .............................................. G06F 17/00
(52) U.S. Cl. ........................ 701/117; 701/118; 701/119; 701/211; 342/357.13; 340/990; 340/995
(58) Field of Search ................................ 701/117, 118, 701/119, 201, 202, 207, 208, 209, 211; 342/357.13; 340/990, 995

(56) References Cited

U.S. PATENT DOCUMENTS

| | | | | |
|---|---|---|---|---|
| 5,428,545 A | * | 6/1995 | Maegawa et al. | 701/118 |
| 5,539,645 A | * | 7/1996 | Mandhyan et al. | 340/905 |
| 5,908,464 A | * | 6/1999 | Kishigami et al. | 340/988 |
| 5,911,773 A | * | 6/1999 | Mutsuga et al. | 340/990 |
| 5,931,888 A | * | 8/1999 | Hiyokawa | 701/208 |
| 6,150,961 A | * | 11/2000 | Alewine et al. | 340/905 |
| 6,236,933 B1 | * | 5/2001 | Lang | 340/905 |
| 6,256,577 B1 | * | 7/2001 | Graunke | 701/117 |
| 6,282,486 B1 | * | 8/2001 | Bates et al. | 340/992 |
| 6,353,795 B1 | * | 3/2002 | Ranjan | 340/905 |

* cited by examiner

Primary Examiner—Michael J. Zanelli
Assistant Examiner—Eric M Gibson
(74) Attorney, Agent, or Firm—Edward C. Kwok; MacPherson Kwok Chen & Heid LLP (57) ABSTRACT

A system and a method for determining and disseminating current traffic information is presented. A traffic data compilation computer linked to a data network collects location data from mobile units, each of which is associated with an identification number. The computer compiles the location data, calculates the velocity of each mobile unit, compares the velocity of each mobile unit against speed limit data stored in a memory, and stores the difference. The traffic data compilation computer determines the traffic condition based on the difference between the velocity of each mobile unit and the speed limit. In addition, traffic data compilation computer may determine the fastest route between point A and point B under the current traffic conditions. Traffic data compilation computer determines the possible routes between point A and point B, retrieves the velocity data from a database, and derives the estimated travel time for each of the possible routes.

35 Claims, 11 Drawing Sheets

| road segment 0 | # of mobile units | average speed | time elapsed since last update | length of segment | est. travel time |
|---|---|---|---|---|---|
| ... | ... | ... | ... | ... | ... |

USING LOCATION DATA TO DETERMINE TRAFFIC INFORMATION

BACKGROUND

1. Field of the Invention

The invention relates to a system and a method for using location information to determine traffic condition.

2. Discussion of the Related Art

Methods for determining the position of vehicles, airplanes, and ships include time difference of arrival (TDOA), angle of arrival (AOA), ray tracing/pattern recognition, global positioning system (GPS), and hybrid methods using network connections. Among the available methods, GPS includes a plurality of satellites orbiting the earth and sending out, at precisely synchronized times, a code sequence that identifies the satellite. Specifically, the code sequence transmitted by each satellite is a precisely timed binary pulse train. In addition to the code sequence, these satellites send out positioning information that can be used to calculate vehicle positions. A GPS receiver retrieves the positioning information from the GPS satellites and triangulates the information to obtain the position of the receiver. A more detailed discussion of a GPS receiver is found in U.S. Pat. No. 5,990,827 to Rodric C. Fan, et al. entitled "Structure of a Position Processing Apparatus," which is herein incorporated in its entirety.

In using GPS to locate vehicles, each vehicle is equipped with a GPS receiver and a wireless transmitter. Using the GPS receiver and the transmitter, the vehicle determines its position and transmits the position to a ground station. The ground station of a conventional vehicle locating system normally includes a map database search system and some type of storage medium that stores digital maps and travel-related information. Thus, upon receiving the vehicle positions from the mobile units, the ground station combines the stored data with the received information and displays the present vehicle positions on a digital map.

In some cases, a data network, such as the Internet, is involved in locating vehicles. When a data network is involved, the vehicle determines its position and transmits the position information to a network server. This data transmission from a vehicle to the network server is accomplished wirelessly by, for example, cellular digital packet data network (CDPD) that connects to a data network (e.g., the Internet), which in turn provides access to the network server. In some cases, the mobile units may transmit raw data to the network server so that the network server can make the position determination. In a system that involves a network server, the data storage medium may be accessed by the network server instead of the ground station. The data storage medium contains travel-related information such as maps, traffic conditions, positions of service stations, and destinations of interest. Thus, the data processing unit organizes the measured position and generates an area map. The area map indicates by a position marker the position of each mobile unit.

As mentioned above, vehicles can connect to data networks (e.g., the Internet) wirelessly through communication networks, for example a CDPD network. CDPD networks consist of Mobile Data Intermediate Systems (MDISs), Mobile Data Base Stations (MDBSs), and Mobile End Stations (MESs). An MDBS offering CDPD services helps a roaming MES register with the MDIS with which the particular MDBS is associated by acting as a conduit for the registration message. An MDIS that handles the registration is referred to as the serving MDIS. Upon receiving the registration message from the MDBS, the serving MDIS informs the home MDIS of the MES of the latter's presence in its coverage area. When a host needs to send data to an MES, it does not have to be aware of the mobility aspect of the MES; it simply transmits data using the MES's IP address as the destination address. The encapsulated data packets for the MES are forwarded to the serving MDIS of the MES. At the serving MDIS, packets are decapsulated to reveal the MES's address. The serving MDIS sends the original data packets to the right channel where the MES is currently located. The MES receives the data packets. If the MES needs to reply, it directly sends data packets using the remote host's IP address as the destination address. CDPD systems are further described in K. Budka et al., "Cellular Digital Packet Data Networks," Bell Labs Technical Journal, Vol. 2, No. 3 (Summer 1997); "Cellular Digital Packet Data Systems Specification: Release 1.1," CDPD Forum, Inc., Chicago (1995); and M. S. Taylor et al., "Internet Mobility: The CDPD Approach," Prentice Hall PTR, Upper Saddle River, N.J. (1996).

With automobiles being the primary mode of transportation for many individuals and organizations, access to real-time traffic information is desired. Traffic information is a combination of several different types of data, such as the number of vehicles on certain road segments, the average speed of the vehicles, and occurrence of accidents. Currently, traffic information is gathered through means such as television cameras disposed at primary points of a road, or through cameramen and reporters in helicopters. As a result, traffic information is available only for certain roads and is not frequently updated. A way of providing travelers with traffic-related information that would minimize travel time is desirable.

SUMMARY

A system and a method for determining and disseminating current traffic information is provided. A traffic data compilation computer linked to a data network collects location data from a plurality of mobile units, each of which is associated with an identification number. The traffic data compilation computer compiles the location data, calculates the velocity of each mobile unit, compares the velocity of each mobile unit against speed limit data stored in a memory, and stores the difference. The difference may be stored in a database, for example in a database indexed by mobile unit identification number. Based on the difference, the traffic data compilation computer determines traffic conditions surrounding each of the mobile units. Upon receiving a request for traffic information from a user, the traffic data compilation computer retrieves traffic data pertaining to a desired geographic area and transmits a traffic level indicator to the user. The user communicates with the traffic data compilation computer through a visual and/or audio interface device coupled to a mobile unit.

In addition, the traffic data compilation computer may examine alternative routes and determine the fastest route between point A and point B under current traffic conditions. In determining the fastest route, traffic data compilation computer determines the possible routes between point A and point B, retrieves velocity data from a database, and derives the estimated travel time for each of the possible routes. The traffic data compilation computer may calculate an accuracy indicator and present it to a user along with traffic information, or along with the estimated travel time. Optionally, traffic data compilation computer may supplement the fastest route or traffic information with predictive data based on a statistical analysis of past traffic patterns, or with marketplace data from third party sources such as radio broadcast, websites, or reports. A user may be allowed to report events to the traffic data compilation computer using an interface device.

DETAILED DESCRIPTION

Figure 1:
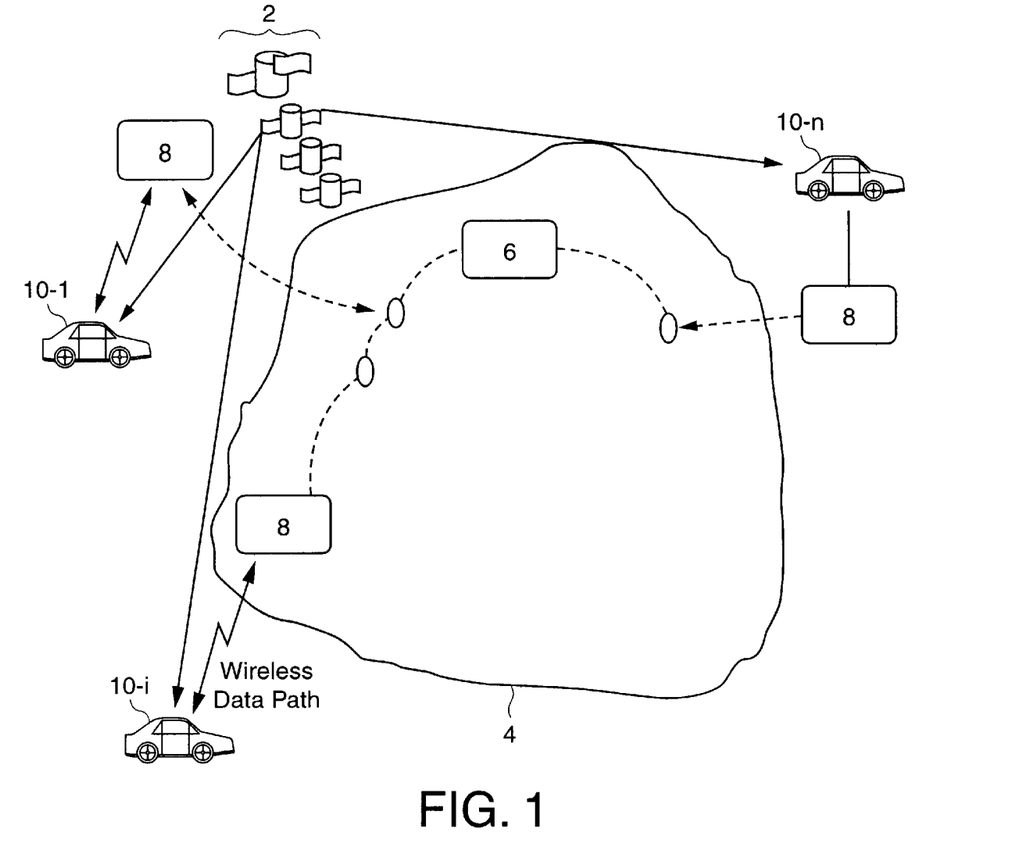
FIG. 1 depicts a system for collecting, determining, and disseminating traffic information in accordance with the present invention.

FIG. 1 provides an overview of one embodiment of the location-based traffic information system 1 in accordance with the present invention. The embodiment of FIG. 1 includes GPS satellites 2, data network 4, service computer 6, wireless communication network 8, and vehicles 10-1 through 10-n. Vehicle 10-i is one of vehicles 10-1 through 10-n, n being the number of vehicles that are part of traffic information system 1. Although FIG. 1 shows vehicles 10-1 through 10-n as being automobiles, vehicle 10-i may be a truck, a motorcycle, a bus, a trailer, or any other vehicle. Data network 4 may be, for example, the Internet. Wireless communication network 8 may be but is not limited to CDPD, GSM, iDEN, AMPS, or CDMA. Although the exemplary embodiment uses GPS satellites 2 to determine locations, any alternative location determining method can be used within the scope of the present invention.

Figure 2:
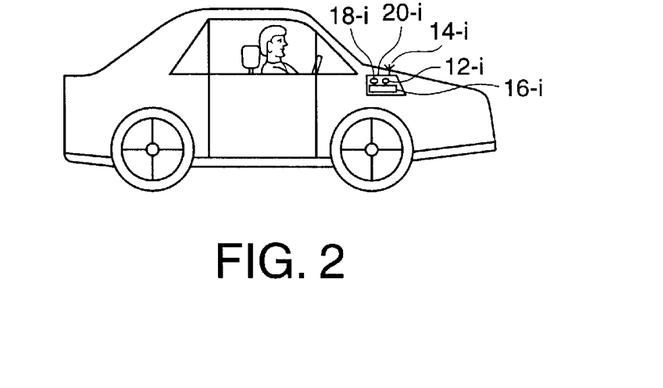
FIG. 2 depicts a vehicle carrying a user and a mobile unit in accordance with the present invention.

As FIG. 2 shows, each vehicle 10-i is equipped with mobile unit 12-i. Mobile unit 12-i receives commands and/or input from user 22-i through a user interface device (not shown), such as a computer, a personal digital assistant (PDA), or a wireless telephone coupled to user interface device port 18-i. Alternatively, the user interface device may be a monitor unit and/or a sound system installed in vehicle 10-i. User 22-i may enter a request and/or a geographic specification such as a route, a street name, or a fixed or floating radius into mobile unit 12-i using the user interface device. Optionally, user 22-i may be able to input traffic information, for example report an accident, through the user interface device. If the user interface device allows graphic display, user 22-i may be able to select an area on a map he wants to obtain information for, or "select out" an area he is not interested in. Depending on the user interface device, user 22-i may enter and receive data in the form of sound, graphics, or a combination thereof.

In some embodiments, user 22-i may be able to change his selection of user interface device as frequently as he desires, among a number of devices available to him. For example, he may designate a monitor unit installed in his car as the user interface device when he is driving, but designate his computer or his wireless phone as the user interface device when he is not in his car.

As used herein, "outbound package" refers to data sent from mobile unit 12-i to service computer 6, and "inbound package" refers to data sent from service computer 6 to mobile unit 12-i. Both an outbound package and an inbound package are sent through wireless communication network 8 and data network 4.

Mobile unit 12-i includes a GPS code receiver 14-i, a transmitter 16-i, a user interface port 18-i, and a processor 20-i. GPS code receiver 14-i of mobile unit 12-i receives GPS code sequences from GPS satellites 2. Processor 20-i converts the GPS code sequences to location data. GPS code receiver 14-i searches frequency channels and receives code sequences from GPS satellites 2. Transmitter 16-i transmits the location data to data network 4 at a regular time interval, for example every time GPS code receiver 14-i receives a new set of codes, or upon receiving a command from the user. The information which user 22-i enters into the user interface device is converted to an outbound package by processor 20-i and transmitted to data network 4 by transmitter 16-i. The GPS code sequences received by receiver 12-i are converted to location data package by processor 20-i and is transmitted to data network 4 by transmitter 16-i. When transmitter 16-i transmits a package to data network 4, the package is automatically labeled with an identification code, e.g. an IP address or a "cookie", which identifies the vehicle whose location is being transmitted.

Whether mobile unit 12-i is installed in vehicle 10-i or simply placed inside vehicle 10-i, transmitter 16-i may be coupled to the engine of vehicle 10-i so that it automatically turns on and off with the engine. By automatically turning off with the engine, transmitter 16-i is prevented from erroneously reporting a parked vehicle as a vehicle in heavy traffic and adversely affecting the accuracy of the traffic data. In addition, transmitter 16-i is also equipped with a manual power switch so that user 22-i can prevent the transmission of location data to service computer 6 when he is doing something other than traveling, for example waiting for a friend outside a building with his engine running.

Figure 3:
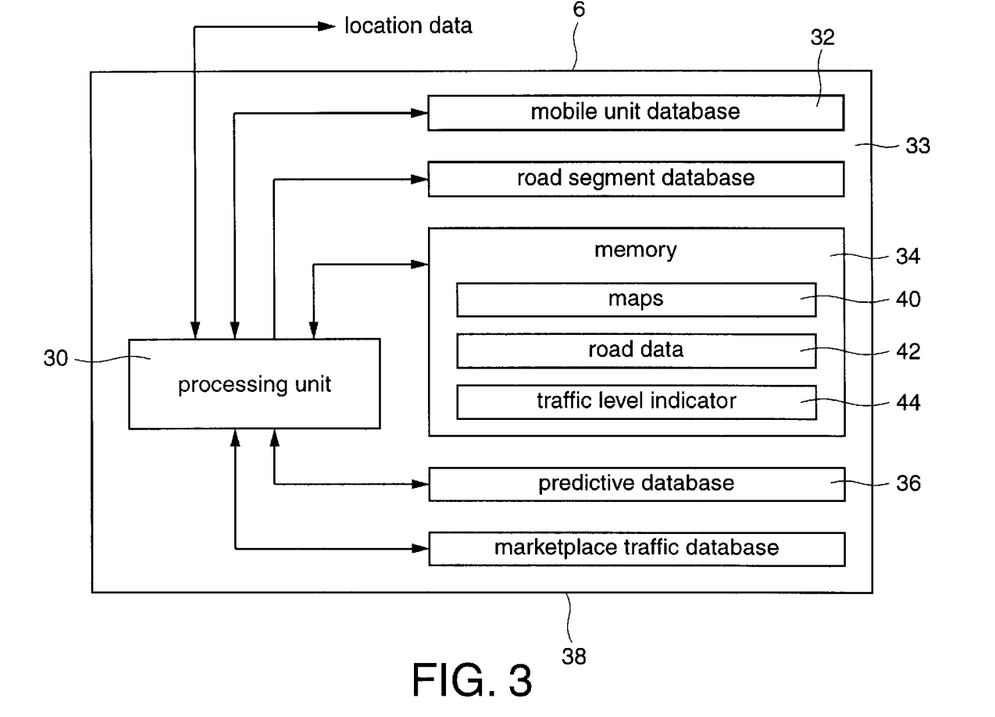
FIG. 3 depicts a computer which collects, determines, and disseminates traffic information in accordance with the present invention.

FIG. 3 shows that service computer 6 includes processing unit 30, which receives location data and outbound packages. Processing unit 30 may be made using a general purpose computer, such as a mainframe computer, or a computer system including a database server and a web page server. Processing unit 30 is coupled to mobile unit database 32, road segment database 33, memory 34, predictive database 36, and marketplace traffic database 38. Service computer 6 uses the received location data to compute the velocity of each mobile unit, which is stored in mobile unit database 32. Mobile unit database 32, which may be indexed by mobile units 12-1 through 12-n, tracks the location and velocity of each mobile unit in the system. Details on the method of determining location data using GPS code sequences is provided in U.S. Pat. No. 5,959,577 to Rodric Fan, et al entitled "Method and Structure for Distribution of Travel Information Using Network," which is herein incorporated in its entirety.

Road segment database 30 is used by processing unit 30 to estimate the travel times from point A to point B, either on a route provided by user 22-i or on a route selected by processing unit 30. A "road segment," as used herein, is a strip of a street or an entire street having a same continuous speed limit.

Memory 34 stores maps 40, road data 42, and level indicators 44. As Memory 34 contains data that is not frequently updated, CD-ROM may be used to implement memory 34. Road data 42 include data such as speed limits and locations of traffic lights, stop signs, one-way streets, gas stations, and toll booths. Road data 42 may also include information regarding toll, number of lanes, and presence of carpool lanes for road segments contained in maps 40. Level indicators 44, which are described in further details below, indicate how heavy the traffic is based on the difference between the speed limit and the average velocity of the vehicles in the specified area. Level indicators 44 may be but is not limited to colors or numbers indicating a certain traffic condition. For example, black, red, purple, yellow, and green dots may be used to indicate a travel speed that is greater than 30 mph below the speed limit (i.e., very heavy traffic), 20–29 mph below the speed limit (i.e., moderately heavy traffic), 10–19 mph below the speed limit, between the speed limit and 10 mph below the speed limit, and higher than the speed limit, respectively.

Predictive database 36 contains historical traffic data for a predetermined time frame (e.g., three days) and traffic pattern data under typical conditions. Traffic pattern data may be based on, for example, a daily or weekly cycle. Historical traffic data allows user 22-i to look up information such as the average travel speed on Bay Street two days ago at 2 p.m. Traffic pattern data allows user 22-i to look up information such as the average travel speeds on Bay Street at 8 a.m. on a typical Monday. Predictive database 36 does not provide information based on current situation, but on past patterns. User 22-i may use predictive database 36 for future planning purposes or to provide directions to another person. Processing unit 30 may use predictive database 36 when it has to select routes that are usually the fastest, as discussed further below in reference to FIG. 12.

Marketplace traffic database 38 contains traffic information obtained without using the automatic reporting of current location by mobile units 12-1 through 12-n. For example, if processing unit 30 is made to search certain websites, marketplace traffic database 38 may contain the information found on a traffic report website or a news website. In addition, if a particular embodiment provides user 22-i with an option to report traffic data, any data entered by user 22-i under that option may be stored in marketplace traffic database 38.

Figure 4:
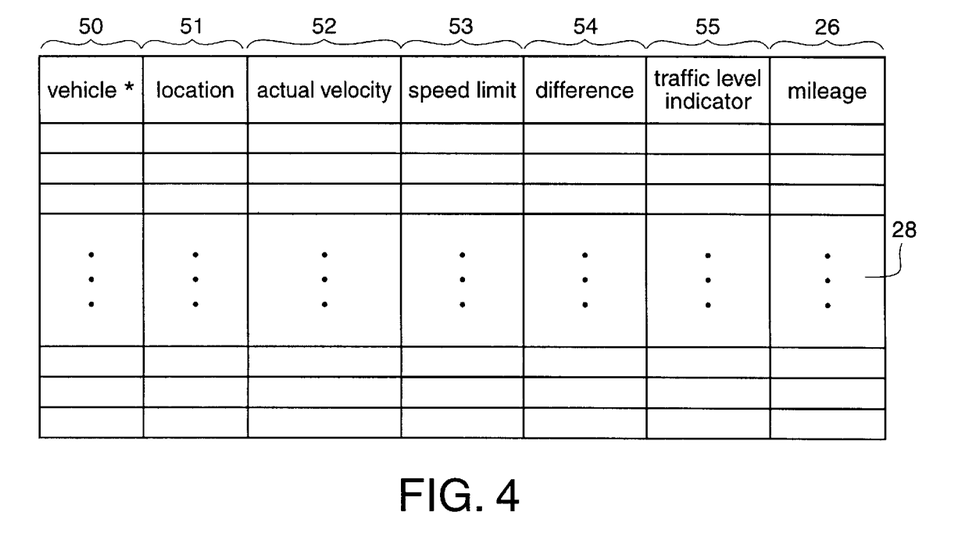
FIG. 4 depicts a mobile unit database a processing unit may use to determine the current traffic condition in accordance with the present invention.

FIG. 4 shows an exemplary table 28 which is indexed by mobile units and used by processing unit 30 to maintain the location and velocity data. Table 28 may be, for example, a part of mobile unit database 32. In addition to the parameters shown in FIG. 4, table 28 may also contain information provided by users 22-1 through 22-n during the initial registration process. Service computer 6 stores data regarding user 22-i, vehicle 10-i, and mobile unit 12-i entered during the registration process in a database, for example in table 28. Data regarding user 22-i may include information such as name, address, telephone number, and e-mail address. Data regarding vehicle 10-i may include the make and model of vehicle 10-i, gas tank size, miles traveled, gas mileage, and license plate number. Data regarding mobile unit 12-i includes a serial number or some type of identification number associated with mobile unit 12-i. In addition, user 22-i may provide a list of device which he plans to use as the user interface device so that service computer 6 may provide him with a customized selection list of user interface devices.

Column 50 of table 28 lists vehicles 10-1 through 10-n whose users 22-1 through 22-n registered with system 1. Column 51 lists the most recent locations received from vehicles 10-1 through 10-n. Column 51 may list the last few locations that were received, as well as the most recent location. After calculating the velocity (i.e., speed and direction) of each vehicle, processing unit 30 stores the actual velocities of each vehicle in column 52. Based on the geographic specification entered by user 22-i, processing unit 30 retrieves from memory 34 the speed limit of the road segment where vehicle 10-i is currently traveling. The retrieved speed limit is stored in column 53. Processing unit 30 calculates the difference between actual velocity (column 52) and speed limit (column 53), and stores the difference in column 54. Processing unit 30 uses the values in column 54 to select a traffic level indicator that accurately represents the traffic condition in the road segment the vehicle is traveling, from level indicator database 36. The traffic level indicator is encapsulated in an inbound package and sent, via data network 4 and wireless communication network 8, to mobile unit 12-i. User 22-i views or hears the content of the inbound package through a user interface device.

Table 28 may also contain mileage information 26, which tracks the number of miles traveled by vehicle 10-i. During registration, user 22-i enters the odometer reading of vehicle 10-i at the time of registration. Based on the mileage information entered by user 22-i, server computer 6 keeps track of the total distance traveled by vehicle 10-i and may send a reminder to user 22-i when it is time for a maintenance check-up. In some embodiments, service computer 6 may also keep track of the gas level in the gas tank of vehicle 10-i and send alerts when the gas level is below a minimum value.

Figure 5:
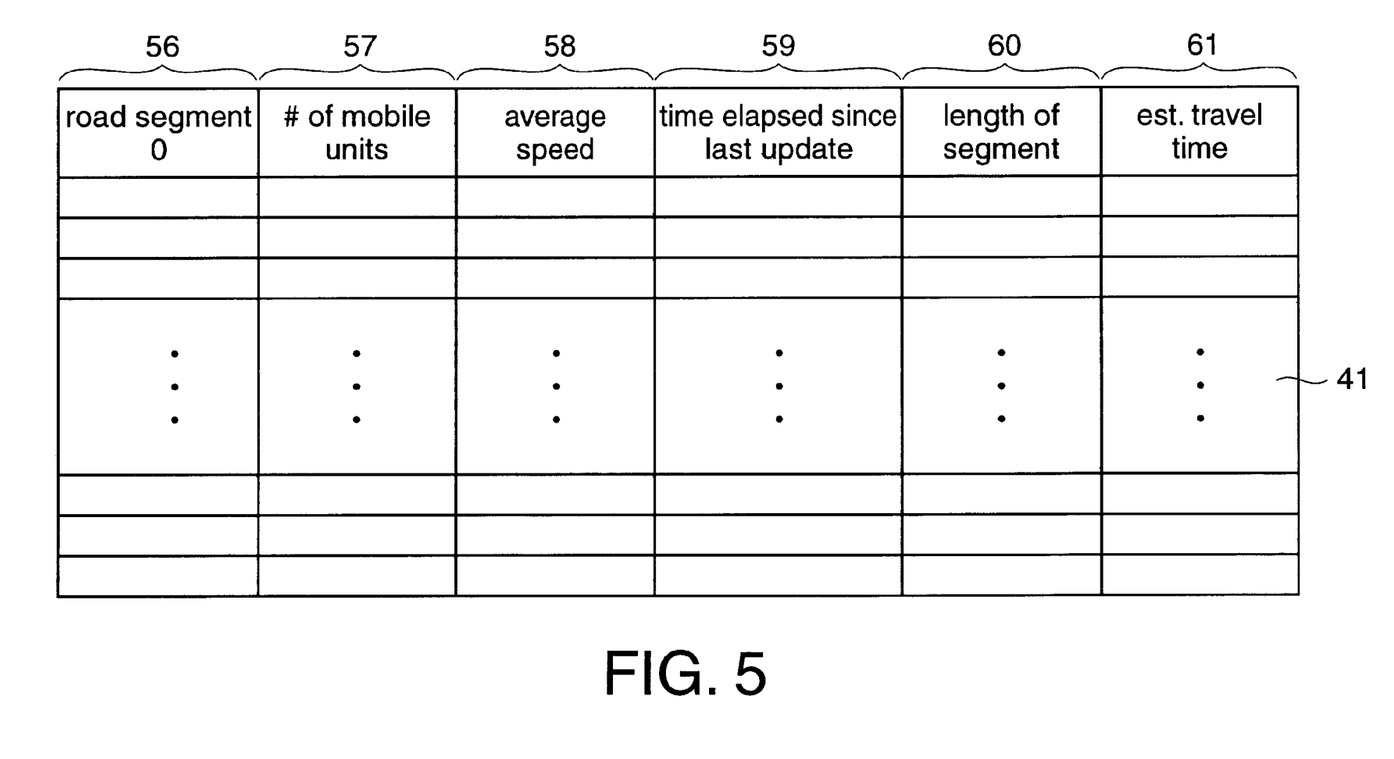
FIG. 5 depicts a road segment database a processing unit may use to determine the estimated travel time on specified routes.

FIG. 5 depicts an exemplary table 41 which, unlike table 28, is indexed by road segments. Table 41 may constitute a part of road segment database 33. As table 41 tracks traffic conditions on each road segment, table 41 is useful for estimating travel times on a selected route. Each road segment that is contained in maps 40 has an identification number, which is entered in column 56 of table 41. Column 57 tracks the number of mobile units that are currently in the road segment identified in column 56. In addition, column 57 may track the identity of each mobile unit that is traveling the road segment identified in column 56. Processing unit 30 obtains the current velocities of each of those mobile units using mobile unit database 32, computes the average velocity, and records the average velocity in column 58. As some road segments are not frequently traveled and there may not always be a "current" velocity available for each road segment, column 59 records an average time elapsed since the last update. Values in column 59 may be, for example, averages of total time elapsed for each of the mobile units traveling in the particular road segment. Column 60 records the length of each road segment identified in column 56. As the length of each road segment is stored in memory 34, for example as a part of road data 42, processing unit 30 may transfer the parameter from road data 42 to column 60. Using average speed stored in column 58 and length of segment in column 60, processing unit 30 computes the estimated travel time, which it stores in column 61.

Figure 6:
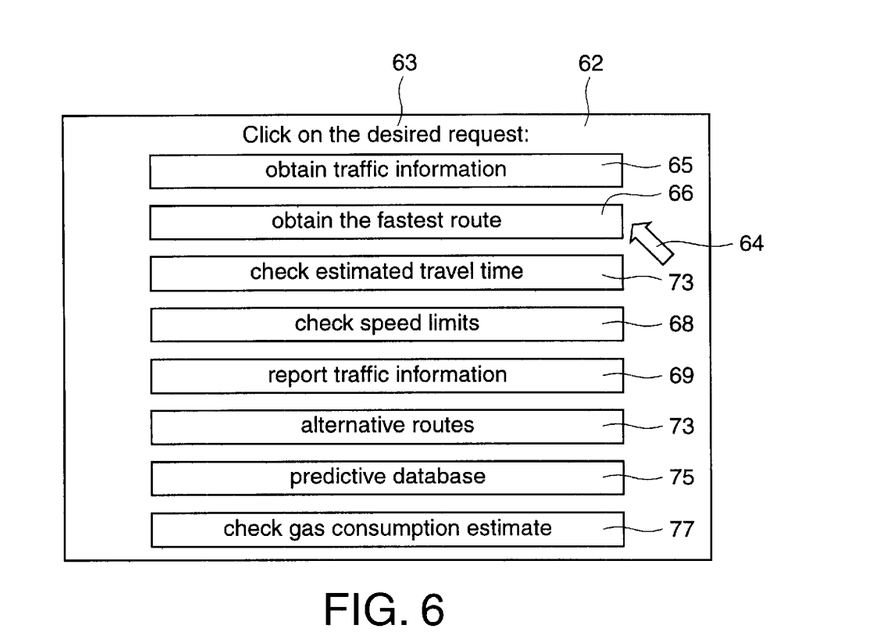
FIG. 6 depicts an image a user may see upon turning on a user interface device coupled to a computer that determines and provides current traffic information in accordance with the present invention.

FIG. 6 shows an exemplary option panel 62 which user 22-$i$ may see on a graphic user interface device upon powering on mobile unit 20-$i$. Option panel 62 includes prompt 63, which asks user 22-$i$ to enter a request. Depending on the user interface device, user 22-$i$ may simply select one of the provided options using indicator 64, speak, or type in a response. Option panel 62 provides user 22-$i$ with options: option 65 to obtain traffic information, option 66 to obtain the fastest route under current traffic conditions, option 67 to check estimated travel time on a specific route, option 68 to check speed limits for a geographic area, option 69 to report traffic information, option 73 to obtain alternative routes, option 75 to access predictive database 36, and option 77 to check gas consumption estimate between two geographic locations. The eight options in FIG. 6 are illustrative, not exhaustive.

Figure 7:
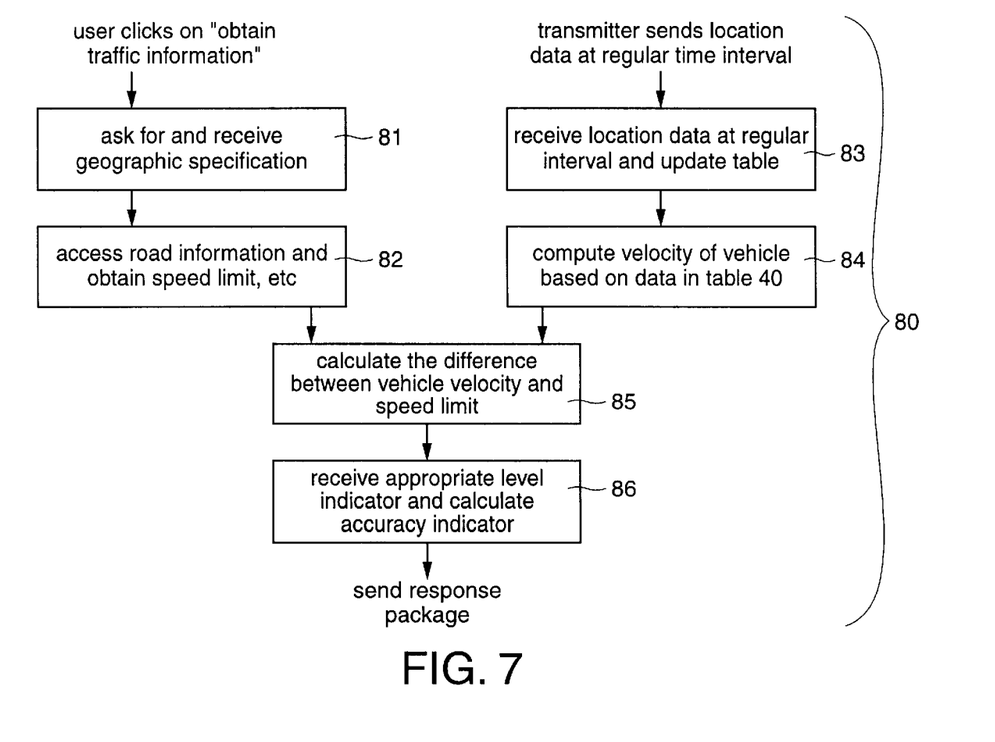
FIG. 7 depicts the process that a processing unit executes in order to collect and determine the current traffic condition in accordance with the present invention.

FIG. 7 depicts process 80, which is triggered when user 22-$i$ selects option 65 to obtain traffic information and the selection is transmitted to processing unit 30 by transmitter 16-$i$. As indicated in stage 81, processing unit 30 prompts user 22-$i$ to specify a geographic area for which she wants the traffic information. In some embodiments, user 22-$i$ may be allowed to provide the geographic specification in more than one format, for example as street names or a radius. If geographic specification is a radius, it may be a fixed point, for example "five mile radius around the intersection of Bay Street and Market Street," or a floating point, for example "five mile radius around my current location." Upon receiving a geographic specification from user 22-$i$, processing unit 30 accesses road information 42 from memory 34 in stage 82. By accessing road data 42, processing unit 30 obtains information such as speed limit, whether the street is a residential street, a major street, or a highway, and the number of traffic lights and/or stop signs. Separately from stages 81 and 82, stage 83 occurs whereby processing unit 30 receives location data from mobile units 12-1 to 12-$n$ at a regular time interval and uses the location data to update table 28. Processing unit 30 calculates the velocity of each of the mobile units 12-1 to 12-$n$ in stage 84, and calculates the difference between the obtained velocity and the speed limit in stage 85. In stage 86, processing unit 30 retrieves a traffic level indicator 44 which represents the traffic condition surrounding the particular mobile unit from which location data was received.

After repeating stages 81, 82, 83, 84, and 85 for every mobile unit 12-$i$ currently located within the specified geographic area, processing unit 30 calculates an accuracy indicator, or a value that indicates the accuracy of data. The accuracy indicator may take into account the number of data points from which the average speeds were derived, consistency of the data with historical patterns, maximum-minimum spread between the fastest and the slowest vehicle in the relevant road segment, or the standard deviation (stage 86). Processing unit 30 creates an inbound package which contains data that may be responsive to the outbound package, and transmits it to mobile unit 12-$i$ which is the source of the outbound package. An inbound package may be transmitted to more than one mobile unit at once.

Figure 8:
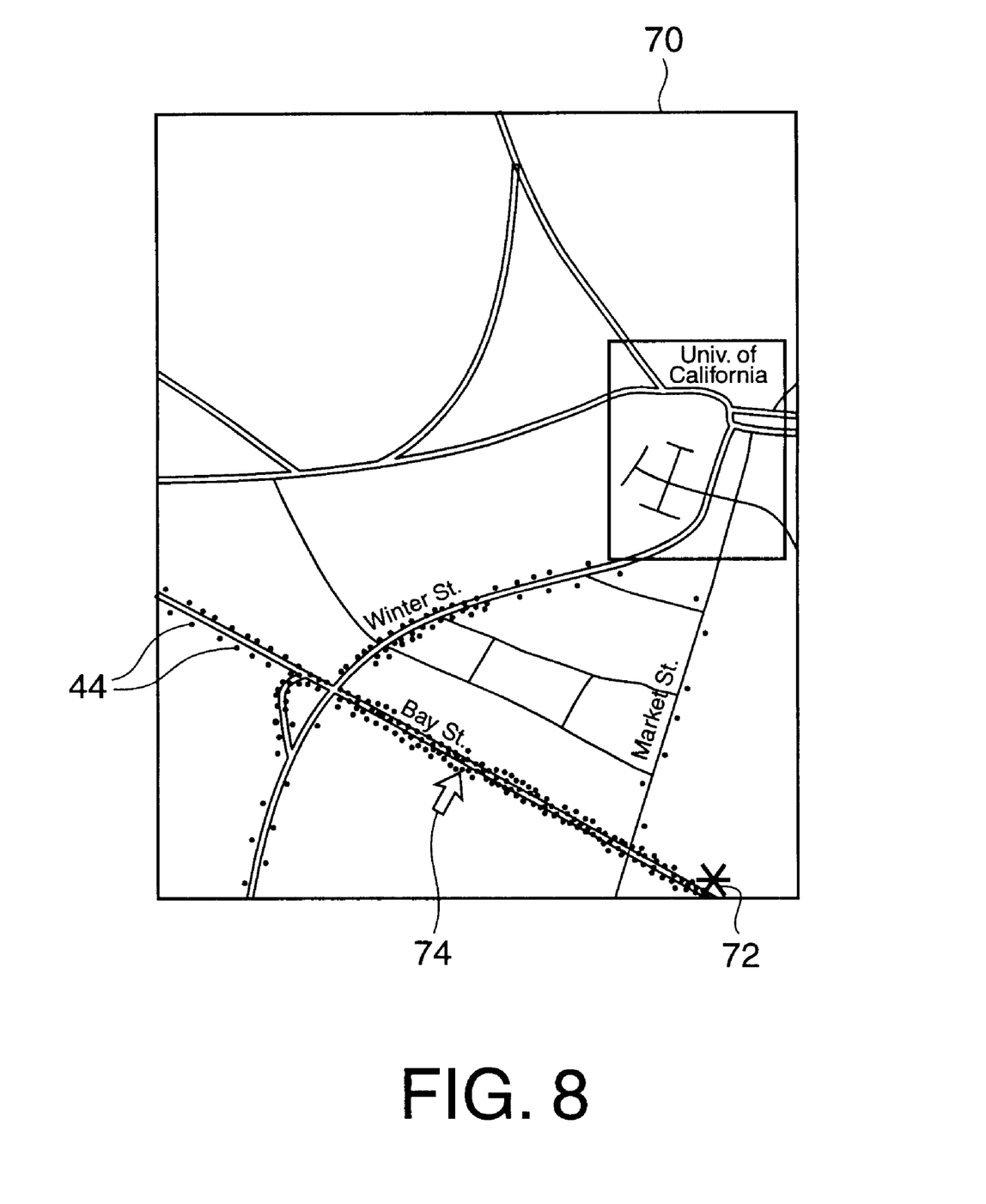
FIG. 8 depicts an image which a user may see on a graphic user interface device in response to a request for traffic information.

FIG. 8 depicts an exemplary image 70 that user 22-$i$ may see on a graphic user interface device when processor 20-$i$ of mobile unit 12-$i$ decapsulates the inbound package and sends it to mobile unit 12-$i$. Image 70 includes traffic level indicators 44 superimposed on a map of the specified geographic area. In the example shown in FIG. 8, each of the dark dots (which may appear as red dots on a color display) indicate a vehicle traveling at more than 30 mph below the speed limit of the street, and each of the white dots (which may appear as green dots on a color display) indicate a vehicle traveling at a speed above the speed limit. Thus, user 22-$i$ can see that Bay Street and a segment of Winter Street are heavily congested while traffic flow is fast on Market Street. Thus, if user 22-$i$ is headed to University of California, user 22-$i$ will know to avoid Bay Street and Winter Street based on image 70. Mark 72 on image 70 indicates an accident. Processing unit 30 can be programmed to send accident notifications upon detecting abnormal change in velocity, such that accident sites are indicated with mark 72 within a short period of time (e.g., 30 seconds) after the accident. Further details on accident detection and notification are provided in U.S. patent application Ser. No. 6,459,988 to Rodric Fan, et al entitled "Method and System for Detecting Vehicle Collision Using Global Positioning System," which is herein incorporated by reference. With reference to image 70, mark 72 indicates that an accident may be responsible for the slow-moving traffic on Bay Street.

Figure 9:
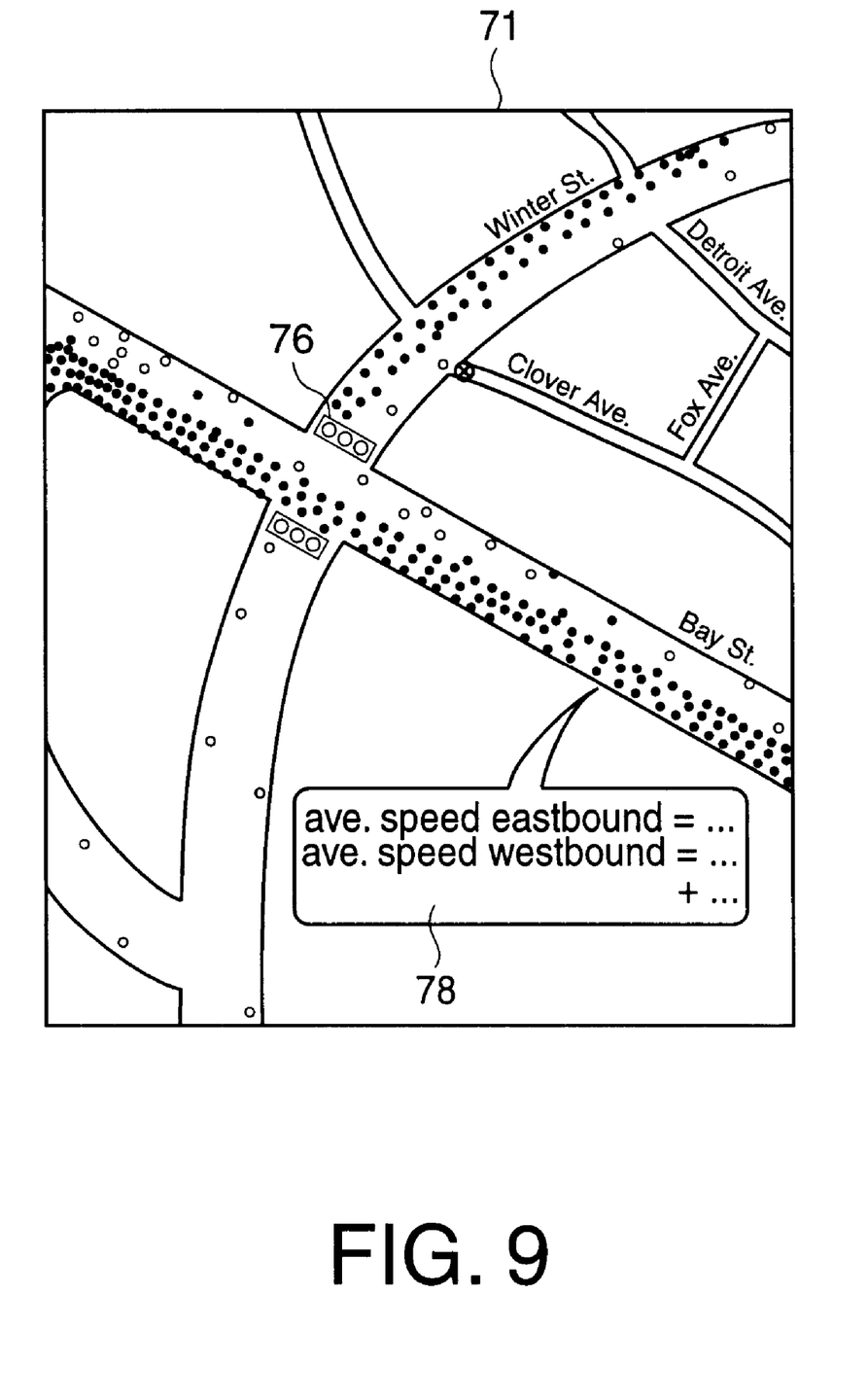
FIG. 9 depicts a zoomed-in version of the image in FIG. 8 with a detailed traffic report superimposed.

FIG. 9 shows zoomed-in image 71, which reveals more details about the traffic congestion on Bay Street. Zoomed-in image 71 may be accessed, for example, by using arrow 74 of image 70 to click on a spot that user 22-$i$ wants to zoom-in on. Zoomed-in image 71 indicates that congestion is worse on Bay Street only in the eastbound lanes, and that traveling westbound on Bay Street may not be so bad. Also, traffic light 76 at the corner of Winter Street and Bay Street may be responsible for the heavy traffic on the part of Winter Street closest to Bay Street. Data about traffic light 76 causing congestion would be useful for a city or locality that is responsible for controlling the traffic lights to provide optimum traffic flow. Box 78 of zoomed-in image 71 provides the average travel speed and the standard deviation on the spot user 22-$i$ clicked on with arrow 74. Depending on the embodiment, image 70 or zoomed-in image 71 can provide more, less, or different data than the exemplary embodiment shown in FIG. 8 and FIG. 9.

Figure 10:
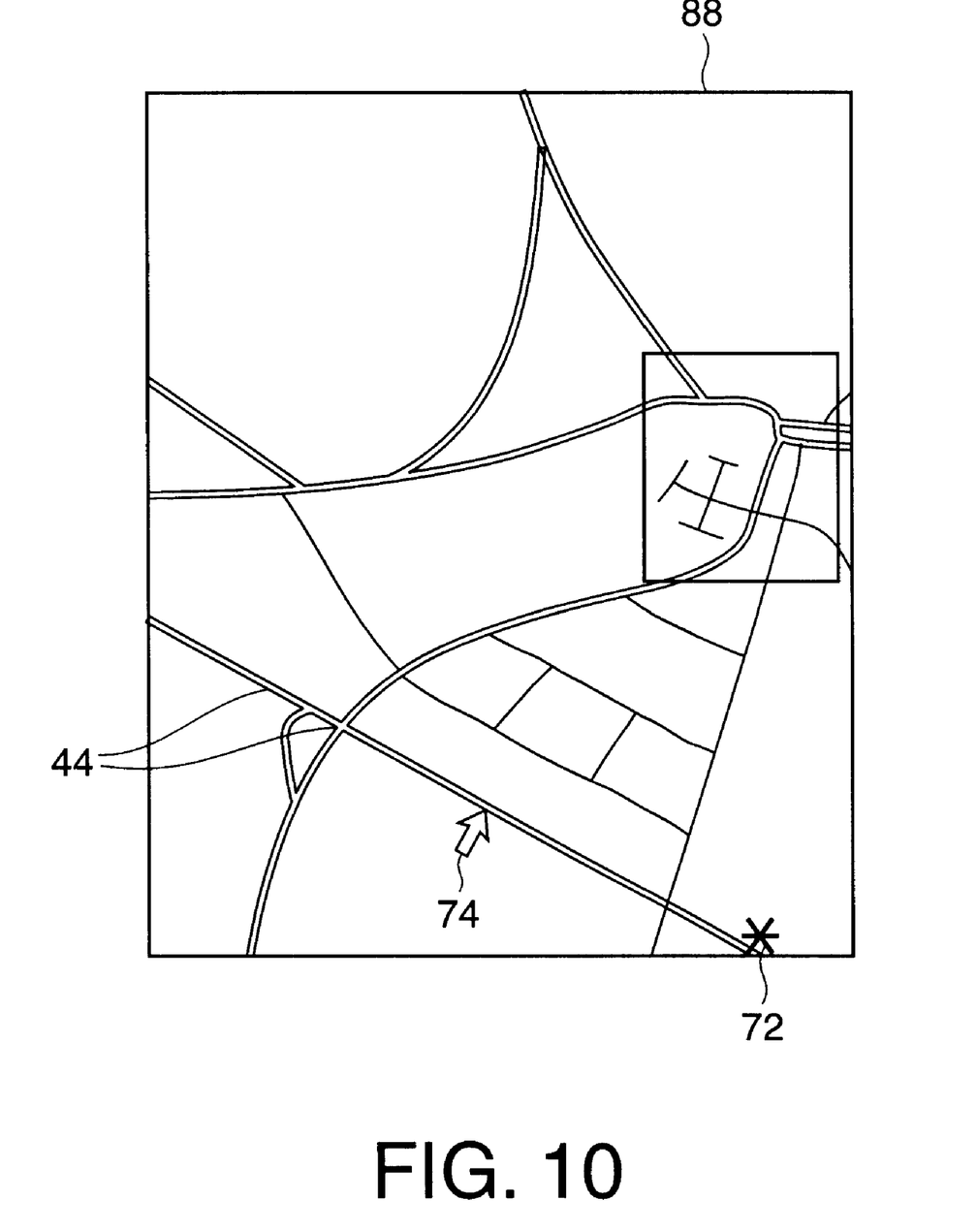
FIG. 10 depicts an alternative embodiment of the image in FIG. 8, using a different type of traffic level indicator.
Figure 11:
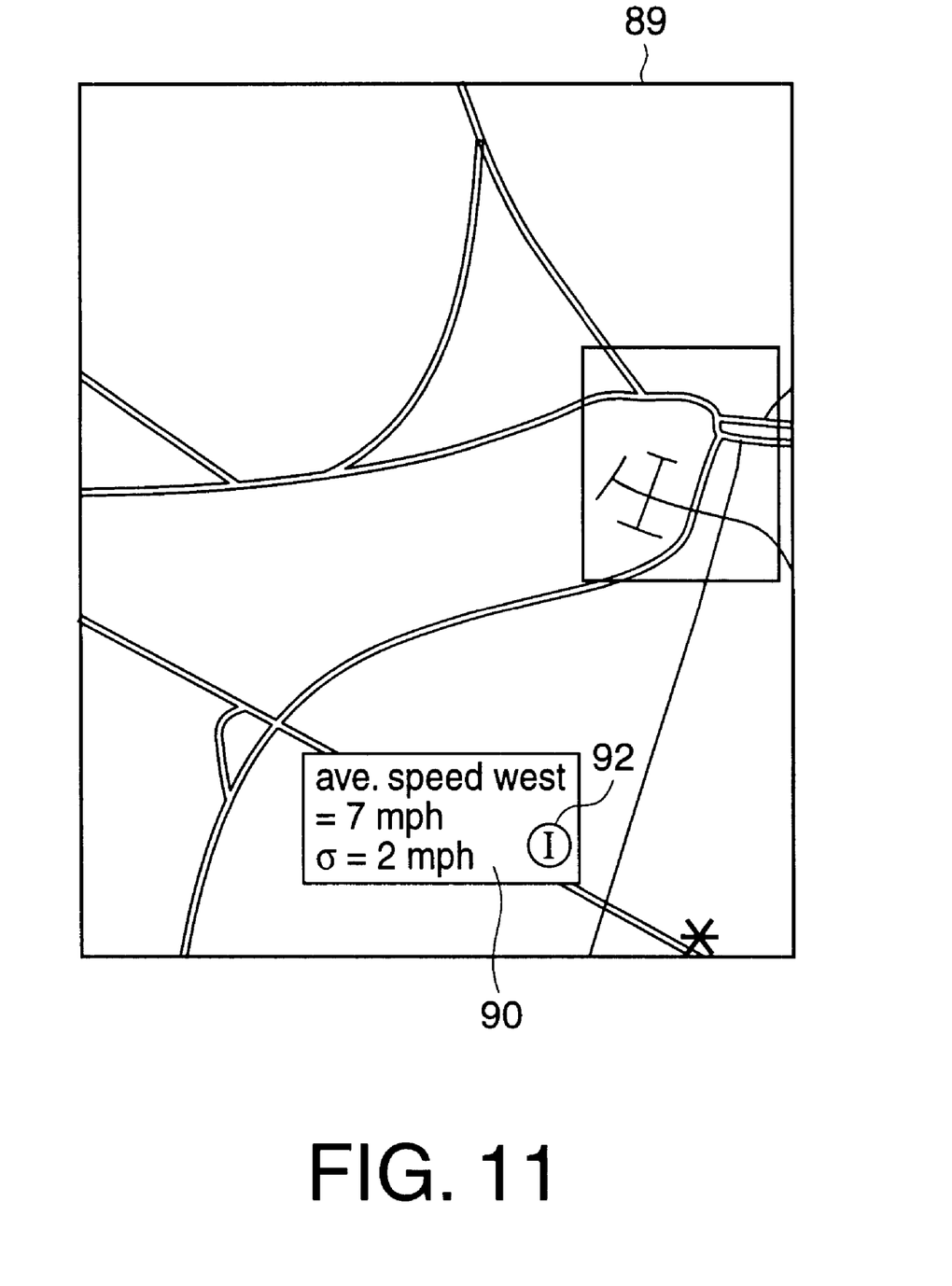
FIG. 11 depicts how a detailed traffic report may be provided in the alternative embodiment of FIG. 10.

FIG. 10 shows image 88 with an alternative traffic level indicator 44. Instead of the dots of the embodiment depicted in FIG. 8, the embodiment in FIG. 9 color-codes the roads. Thus, Bay Street is colored dark (red) instead of being covered with dark dots. When user 22-$i$ clicks on arrow 74 to obtain more information about Bay Street, box 90 may pop up at the clicked spot, providing information such as the average speed and the standard deviation, as in image 89 of FIG. 11. The information provided by image 88 and image 89 may be accompanied by or replaced with sound or speech, depending on the type of user interface device. For example, if the user interface device is a wireless telephone with a small graphic display, much of the communication between the device and user 22-$i$ may include pressing the number buttons or sound. Optionally, image 70 or zoomed-in image 71 can provide an indicator, such as the circled "I" 92, if there is recent data in marketplace traffic information database 38.

Figure 12:
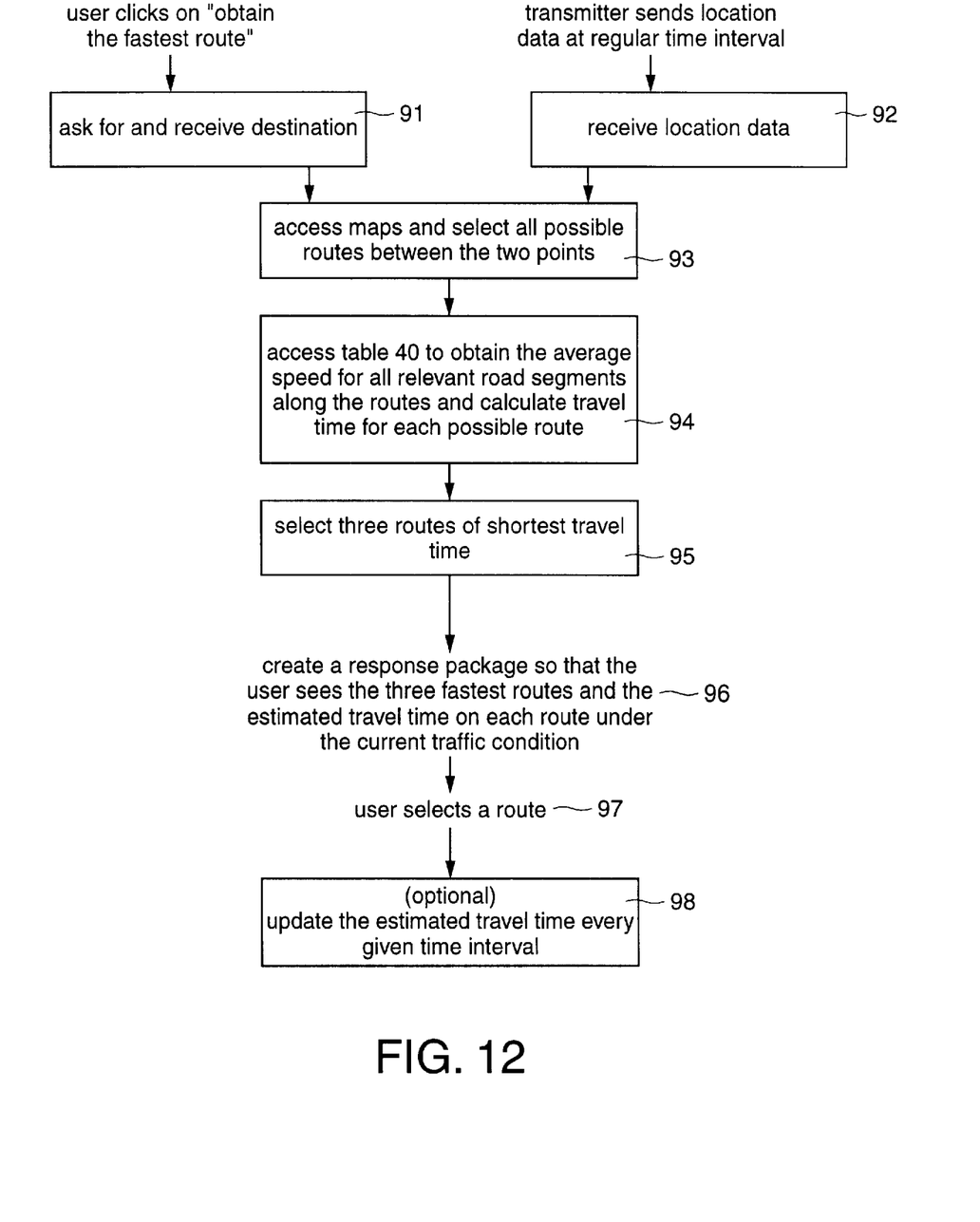
FIG. 12 depicts the process that a processing unit executes in response to a request for the fastest travel route to a specified destination under the current traffic condition in accordance with the present invention.

FIG. 12 depicts the process which is triggered if user 22-*i* selects option 66 to obtain the fastest route in option panel 62 of FIG. 6. Upon receiving the selection, processing unit 30 transmits an inbound package asking for a geographical specification, such that user 22-*i* sees a prompt on the graphic display of a user interface device. The prompt may provide user 22-*i* with the option of entering a starting point and a destination, or just a destination. In the latter case, processing unit 30 may assume that the starting point is the current location of vehicle 10-*i*, which it can retrieve from mobile unit database 32. In stage 93, processing unit 30 accesses maps 40 and determines the possible routes between the starting point and the destination. User 22-*i* may limit the number of possible routes, for example to five routes, in which case processing unit 30 would have to rely on predictive database 36 to select the five routes which would lead to the shortest travel time absent a non-routine occurrence, such as an accident or construction. In stage 94, processing unit 30 accesses table 28 and table 41 and collects data from vehicles on all the routes determined in stage 93. In stages 94 and 95, processing unit 30 determines the travel time for each route by adding up the average travel time of all segments along each of the routes, and selects a predetermined number of routes, for example three routes, which are associated with the shortest travel time under the current traffic conditions. Processing unit 30 creates an inbound package and transmits it to mobile unit 12-*i*, processor 20-*i* of which converts the format into one that is appropriate for the user interface device. User 22-*i* receives the information about the routes of shortest travel time. Optionally, user 22-*i* may select one of the routes, and processor 20-*i* may be connected with a navigator so that it can provide driving directions to user 22-*i* along the selected route. A navigator that can provide real-time driving directions is disclosed in U.S. Pat. No. 6,026,346, which is herein incorporated by reference.

Figure 13:
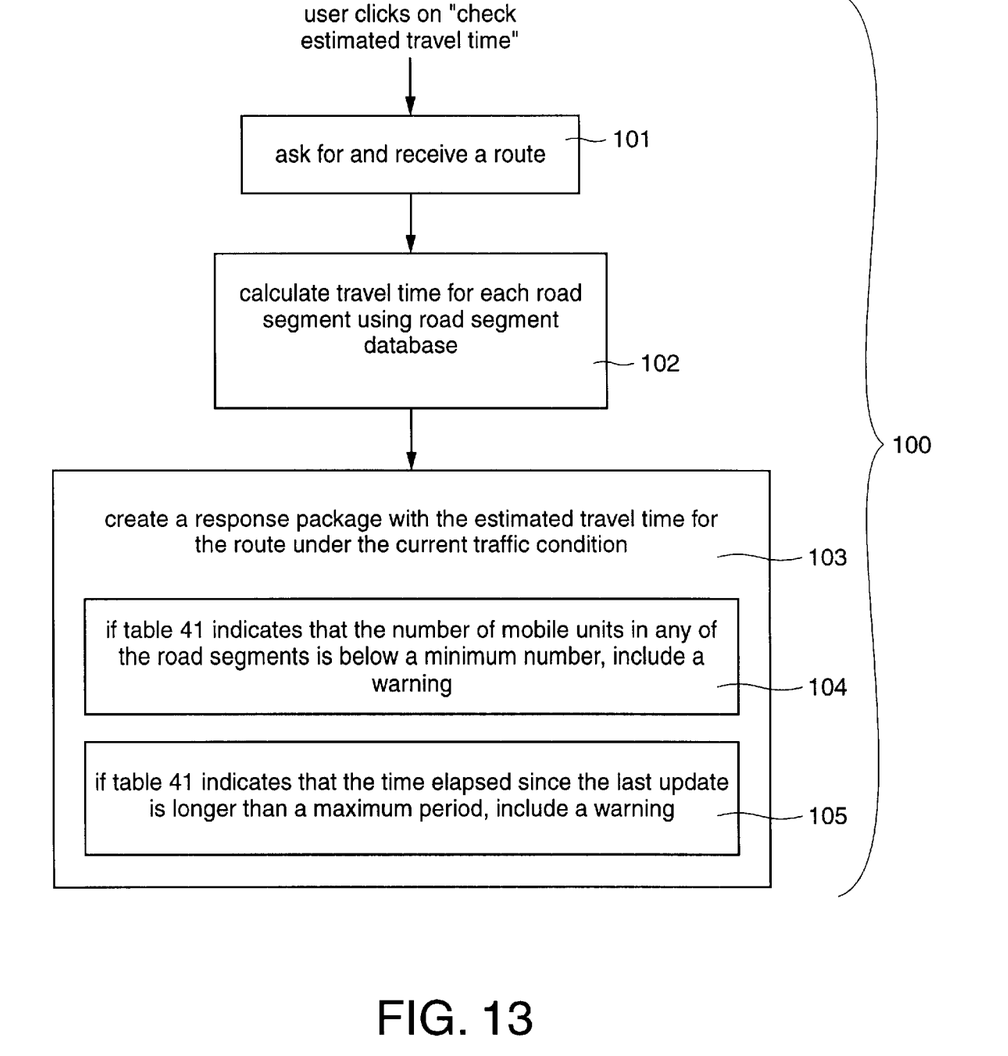
FIG. 13 depicts the process that a processing unit executes in response to a request for estimated travel time from point A to point B under the current traffic conditions.

FIG. 13 depicts a process 100 which is triggered if user 22-*i* selects option 67 to check the estimated travel time in option panel 62 of FIG. 6. Upon receiving the selection, processing unit 30 enters stage 101 and transmits an inbound package asking for a geographical specification, such as a route. Upon receiving a geographical specification, processing unit 30 accesses table 41, column 61 of which records the estimated travel time for each road segment under the current traffic conditions. In stage 102, processing unit 30 adds up the estimated travel time for each road segment or portion of road segment along the specified route. In stage 103, processing unit 30 creates an inbound package with the sum. Sub-stages 104 and 105 indicate that if the number of mobile units on a road segment in column 57 is below a predetermined minimum number, or if the average time elapsed since the last update (column 59) exceeds a certain maximum value, the inbound package may contain an accuracy warning. The accuracy warning may be a phrase or a mark indicating that the accuracy is low due to a part of the route being infrequently traveled by mobile units of the system. Alternatively, the accuracy warning may include a time range, such as the estimated travel time assuming the worst case scenario (heavy traffic) on the road segments that do not have sufficient data. Other embodiments may indicate the degree of accuracy with a number associated with the length of the road segment responsible for the lower accuracy.

Sometimes, user 22-*i* may select option 68 to check speed limits or to find out road types (e.g., residential, highway, etc.) for certain routes, irrelevant of current traffic conditions. Upon receiving option 68, processing unit 30 may request a geographic specification, such as a route or a radius. Upon receiving a response, processing unit 30 retrieves the speed limit information from memory 34, superimposes the information on a map of the specified geographic area, and creates an inbound package. In some embodiments, option panel 62 may allow user 22-*i* to request any information in road data 42, such as the number of traffic lights along certain routes.

If user 22-*i* selects option 69 to enter traffic information, processing unit 30 may provide user 22-*i* with options, such as "accident," "construction," or "blocked." Depending on the embodiment, user 22-*i* may be limited to selecting one of the options and providing a geographic specification, or may be allowed to enter additional data. The selection or the data is transmitted to processing unit 30, which then stores the data in marketplace traffic database 38.

If user 22-*i* selects option 73, thereby requesting service computer 6 to provide alternative routes between two geographic locations, a process similar to the process in FIG. 12 is triggered. In some embodiments, user 22-*i* may be able to specify different criteria that reflect his preferences, for example a route with minimum number of traffic lights, the fastest route, or a freeway route. Depending on the preference specified by user 22-*i*, stage 95 of FIG. 12 is adjusted. User 22-*i* may select option 75 to access predictive database 36, to obtain historic data or traffic pattern data.

Figure 14:
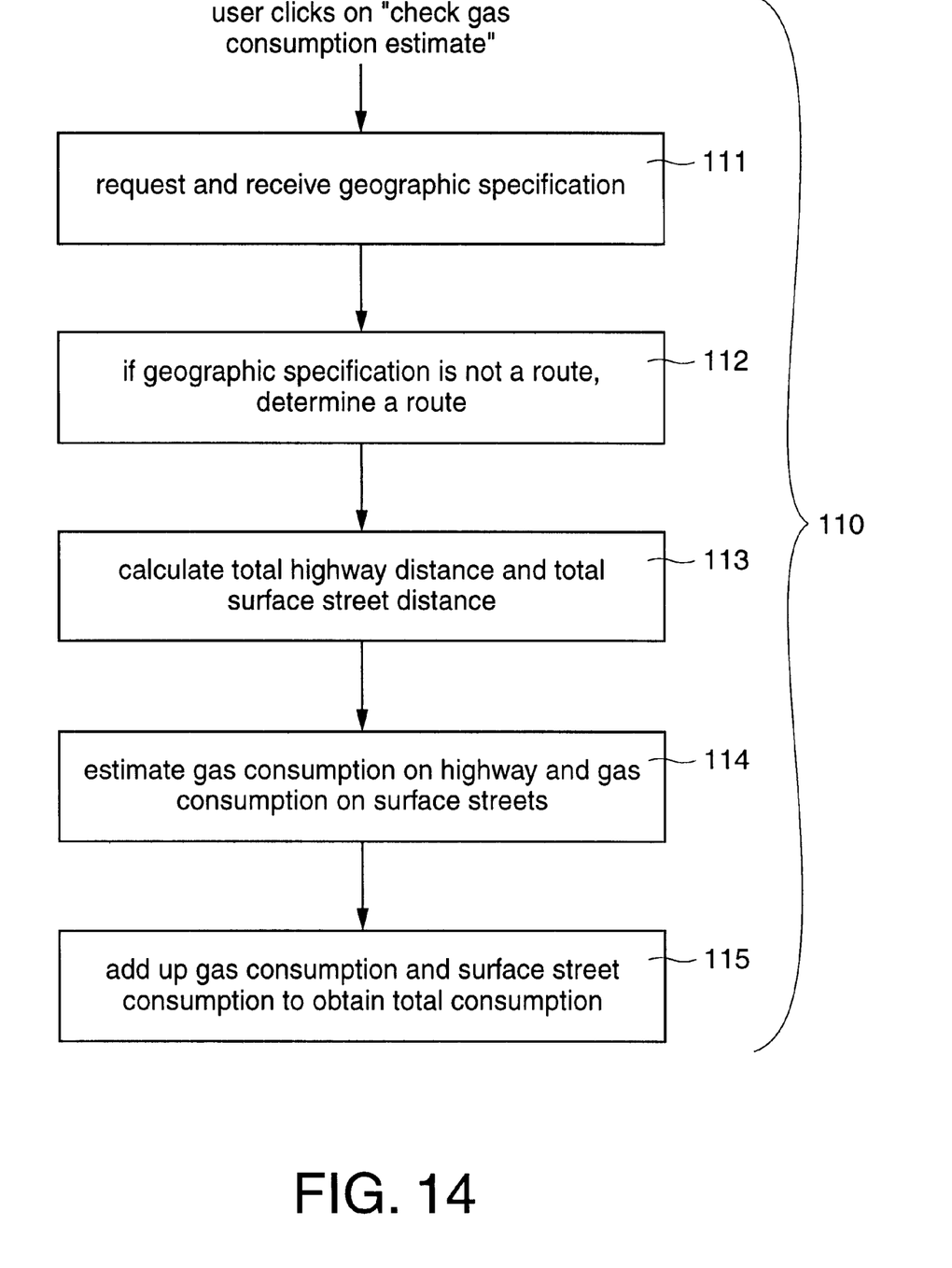
FIG. 14 depicts the process that a processing unit executes in response to a request for an estimate of gas consumption in traveling from point A to point B under typical traffic conditions.

FIG. 14 provides process 110, which is triggered when user 22-*i* selects option 77 to get an estimate of gas consumption in traveling from one geographic location to another. Upon making the selection, processing unit 30 prompts user 22-*i* to enter a geographic specification, in stage 111. If user 22-*i* provides the geographic specification in a form other than a specific route, processing unit 30 determines the route in stage 112, which includes a process similar to the process in FIG. 12. Once the route is determined, processing unit 30 accesses road data 42 to categorize the roads along the route into highways and surface streets, and separately adds up the distances of all road segments that constitute the highways and all road segments that constitute the surface streets, in stage 113. In stage 114, processing unit 30 pulls the miles-per-gallon information from table 28 and estimates a sum of the number of gallons vehicle 10-*i* will use to travel the highways and the number of gallons vehicle 10-*i* will use to travel the surface streets. The sum calculated in stage 115, indicates an estimated number of gas consumption.

Although the present invention is described using the above embodiments, the scope of the invention is not limited by the embodiments provided herein. Numerous variations and modifications are possible within the scope defined by the following claims.

What is claimed is:

1. A method of determining current traffic conditions, said method comprising:

receiving a location of a mobile unit over a data network;

computing an actual velocity of said mobile unit using said location; and     calculating a parameter using said actual velocity and location, said parameter indicating traffic conditions surrounding said mobile unit, wherein said calculating comprises:

receiving a geographic specification from a user;

retrieving speed limit of a road segment located within the boundaries of said geographic specification;

calculating the difference between said speed limit and said actual velocity; and selecting a traffic level indicator representative of said difference.

2. The method of claim 1, wherein said location is derived with at least one of:
Global Positioning System;
Time Difference of Arrival;
Angle of Arrival; and
ray tracing method.

3. The method of claim 1, wherein said data network comprises a wireless communication network.

4. The method of claim 1, wherein said data network comprises:
a wireless communication network; and
the Internet.

5. The method of claim 1, wherein said receiving occurs at a predetermined time interval.

6. The method of claim 1, wherein said calculating comprises accessing road data from a database.

7. The method of claim 1, wherein said calculating comprises:
accessing the speed limit of said location; and
calculating the difference between said actual velocity and said speed limit.

8. The method of claim 1, further comprising transmitting to a mobile unit an image representative of said geographic specification, said image superimposed with said traffic level indicator.

9. The method of claim 8, wherein said traffic level indicator comprises an accident indicator marking an accident site.

10. The method of claim 8, wherein said traffic level indicator represents a speed range at which said mobile unit is traveling.

11. The method of claim 8, wherein said geographic specification comprises at least one of:
a route;
a radius; and
a geographic area having objectively definable boundaries.

12. The method of claim 8, further comprising storing said geographic specification in a database for repeat use.

13. The method of claim 1, further comprising:
calculating an accuracy indicator based on the number of locations received, said accuracy indicator indicating a possible degree of error; and
transmitting said accuracy indicator to a user interface device over said data network.

14. The method of claim 13, wherein said accuracy indicator comprises a spread between a maximum velocity and a minimum velocity in a road segment.

15. The method of claim 13, wherein said accuracy indicator comprises standard deviation of said maximum and minimum velocities of a road segment.

16. The method of claim 13, wherein said data network comprises the Internet.

17. The method of claim 13, wherein said user interface device comprises a wireless device.

18. The method of claim 1, further comprising transmitting an alert signal to said mobile unit if said parameter reaches a preselected value.

19. A device for determining current traffic condition, said device comprising:
a processing unit;
a database coupled to said processing unit, said database storing results of calculation performed by said processing unit; and
a memory for storing maps, traffic level indicators, and road data coupled to said processing unit, each of said traffic level indicators being calculated based on a difference between a speed limit at a road segment, obtained from said road data, and an average velocity of vehicles at said road segment.

20. The device of claim 19, wherein said processing unit is coupled to a data network transmitting data to and receiving data from a plurality of mobile units.

21. The device of claim 20, wherein said database comprises a table indexed by a mobile unit identification number, said table containing velocities of each of said plurality of mobile units.

22. The device of claim 19, wherein said database comprises a table indexed by location, said table containing current average travel speed for a location.

23. The device of claim 19, further comprising a predictive database coupled to said processing unit, said predictive database storing traffic pattern based on a statistical analysis of past traffic cycles.

24. The device of claim 19, further comprising a historical database storing traffic patterns of a preselected area for a predetermined time frame in the past.

25. The device of claim 19, further comprising a marketplace traffic database coupled to said processing unit, said marketplace traffic database storing traffic information obtained from a user or a third party.

26. The device of claim 19, wherein said road data comprises at least one of:
speed limit for a road segment;
distance of a road segment;
location of gas stations;
location of toll booths;
an indication of whether said road segment is a one-way street;
an indication of whether there is a carpool lane on said road segment;
location of traffic lights and Stop signs; and
number of lanes on said road segment.

27. A method of estimating a travel time between a first geographic location and a second geographic location, said method comprising:
determining a route between said first and second geographic locations;
receiving locations of a plurality of mobile units along said route over a data network;
computing an average velocity of said plurality of mobile units on said route;
providing a traffic level indicator for said route based on said average velocity and a speed limit along said route; and
deriving said travel time using the distances of said route, and said traffic level indicator.

28. The method of claim 27, wherein said determining comprises using past traffic pattern stored in a database.

29. The method of claim 28, further comprising:
calculating a reliability of said travel time;
selecting a reliability indicator representative of the result of said calculating; and
incorporating said reliability indicator into said travel time.

30. The method of claim 27, further comprising creating a warning package if said average velocity is based on fewer than a minimum number of data points.

31. The method of claim 27, further comprising creating a warning package if said average velocity is based on a location data received more than a predetermined value of time.

32. A system for providing current traffic conditions, said system comprising:
- a plurality of mobile units each adapted to provide a current location;
- a wireless communication network accessible by said mobile units to report the current locations;
- a data network linked to said wireless communication network; and
- a processing unit linked to said data network to receive said current locations, said processing unit being adapted to compute a traffic level indicator based on an average velocity derived from said current locations of said mobile units.

33. The system of claim 32, wherein said mobile unit comprises:
- a GPS code receiver;
- a location data calculator coupled to said GPS code receiver;
- a transmitter coupled to said location data calculator and to a data network; and
- a port coupled to said location data calculator and to a user interface device.

34. The system of claim 33, wherein said user interface device comprises at least one of:
- a display unit;
- a Personal Digital Assistant; and
- a telephone.

35. The system of claim 32, wherein said wireless communication network is selected from a group consisting of CDPD, GMS, iDEN, AMPS and CDMA.

* * * * *